May 7, 1968 J. G. VAN BOSSE 3,382,489
ELECTRONIC-TO-ELECTROMECHANICAL DISTRIBUTORS
Filed Feb. 28, 1966
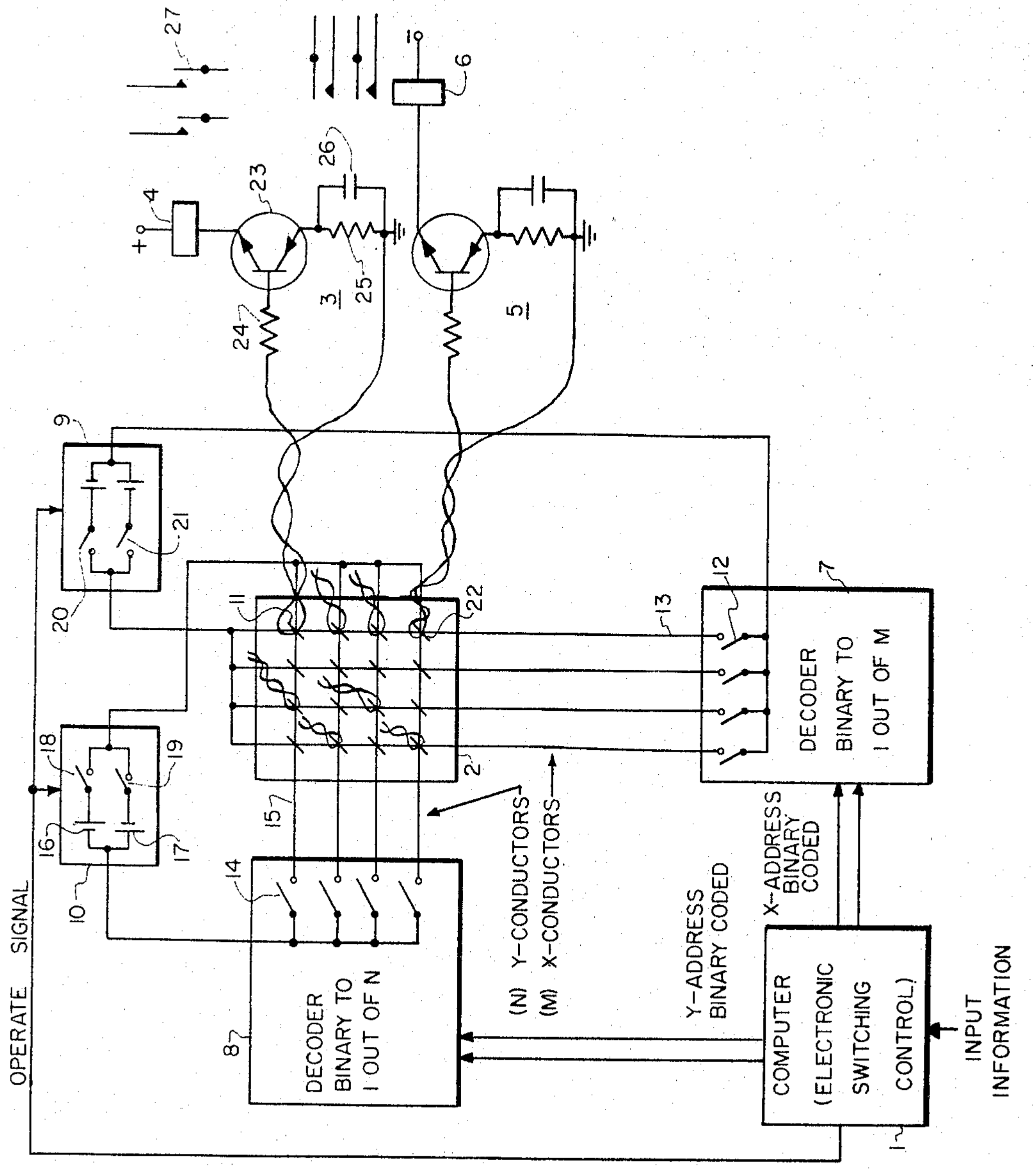
INVENTOR.
JOHN G. VAN BOSSE
BY Glenn H. Antrim
AGENT United States Patent Office 3,382,489
Patented May 7, 1968

3,382,489
ELECTRONIC-TO-ELECTROMECHANICAL DISTRIBUTORS

John G. Van Bosse, Park Ridge, Ill., assignor to Automatic Electric Laboratories, Inc., Northlake, Ill., a corporation of Delaware Filed Feb. 28, 1966, Ser. No. 530,663
6 Claims. (Cl. 340—172.5)

This invention pertains to distributors or converters for translating information from high-speed electronic control equipments to electromechanical equipments that operate at relatively slow speeds.

In modern switching systems, such as communication switching systems, electronic components are frequently employed side by side, and interconnected with electromechanical components. Electronic components are used where rapid operation and conservation of space are important. Electromechanical components, such as relays, are used where high speeds are not required, but where relatively large amounts of power are to be switched.

A typical system using both these types of components is one in which a single high-speed electronic switching control circuit is coupled, by means of a distributor, to many slower operating circuits. The electronic equipment applies control information to memory elements that cause operating current to be applied to electromechanical elements long enough to operate them. When separate hold circuits are not provided for electromechanical devices to maintain them operated, the operating circuits that are controlled by the memory elements must continue to provide operating current until information applied through the electronic switching control circuit commands release of the particular operated device.

The distributor of the present invention uses bistable memory cores to control bistable semiconductor devices (controlled rectifiers) that operate respective electromechanical devices. In order for a distributor to contain a minimum number of parts for controlling many electromechanical devices, the memory cores are arranged in a usual matrix, and each core is connected to a type semiconductor device or transistor that can be gated on by application of a pulse of one polarity and gated off by a pulse of opposite polarity. The matrix provides, in a usual manner, that the number of outputs is equal to the product of the number of inputs for columns multiplied by the number of inputs for rows.

In the present circuit, a bidirectional current sender is provided for the column circuits and also for the row circuits so that every core of the matrix can be operated in either direction between on and off states at any desired time independent of the states of any other core. Therefore, a single core and a corresponding gate-controlled transistor controls the operation or release of each electromechanical device at any desired time. Regardless of how slowly the electromechanical devices operate or how long they remain operated, the electronic switching control circuit is employed for only a few microseconds at a time to command that any device be operated or be released.

An object of the present invention is to provide electronic-to-electromechanical distributors that use a minimum number of component parts for both operating and releasing electromechanical devices.

A feature of the invention is the means for deriving from a selected core a pulse of one polarity for operating an electromechanical device and after any desired interval deriving a pulse of opposite polarity to release the selected electromechanical device.

Another feature is the utilization of bistable drivers connected to the cores for operating the electromechanical devices.

The objects, the following description, and the appended claims may be better understood by reference to the accompanying drawing in which the single figure is a simplified block and schematic diagram of an embodiment of the distributor of this invention.

An electronic switching control 1 generates commands to select any core of a memory matrix 2 and to change state of the selected core. A respective bistable driver, such as represented by transistor circuits 3 and 5, responds to a change-of-state of the selected core either to operate or to release a respective relay such as represented by relays 4 and 6.

The electronic switching control circuit 1 controls a decoder 7 to connect windings of a selected column of the cores of the matrix 2 in a circuit that includes current sender 9 and controls a decoder 8 to connect windings for a selected row of the cores of the matrix 2 in a circuit that includes current sender 10. After selection of a particular core in the memory matrix 2, the electronic switching control 1 commands the sender to transmit the current in that direction according to the present state of the selected core to cause the selected core to change state. The change of state of the core produces a pulse of required polarity to change the state of operation of the bistable driver that controls a corresponding electromagnetic relay.

For a detailed understanding, the distributor of the accompanying figure, is described according to an application for controlling supervisory signals in telephone systems. The electronic switching control 1 processes input information according to calls initiated by subscribers. The electronic switching control 1, which is essentially a computer, is programmed to provide a distinctive output binary signal corresponding to a particular function for each core in the memory matrix 2. Subsequently, the computer supplies to current senders 9 and 10 signals for determining that direction of current flow required for the memory matrix 2 to cause a selected core to change state.

The electronic switching control 1 has one output for supplying $x$-address connected to input control circuits of the decoder 7 and has another output for $y$-address connected to input control circuits of the decoder 8. Both the $x$-addresses and $y$-addresses, in this example, are binary coded. The decoder 7 has outputs connected to the $m$-number of conductors, or branch circuits that are connected to windings in corresponding columns of magnetic cores in the memory matrix 2, and likewise the decoder 8 has outputs connected to the $n$-number of conductors that are connected to windings in corresponding rows of magnetic cores in the matrix 2. In response to the application of binary coded signal from the electronic switching control 1 to decoder 7 or decoder 8, a switch for a corresponding $x$-conductor or $y$-conductor of the memory matrix 2 is closed. Briefly, the decoders 7 and 8 translate binary input signals to one-out-of-$m$ or one-out-of-$n$ outputs respectively.

Specifically, when relay 4 is to be operated or is to be released, the core 11 of matrix 2 must be selected for change-of-state. The core 11 has one winding connected in a series circuit with corresponding windings of other similar cores that are arranged in a respective column. The windings for this column are connected by a conductor 13 to switch 12 of decoder 7. Likewise, core 11 has another winding connected in a series circuit with corresponding windings of a respective row, and the windings for this row are connected by a conductor 15 to a switch 14 of the decoder 8. In response to input information and in accordance with the program of the computer 1, the computer 1 applies binary code that corresponds to a function that requires the selection of the core 11 and the accompanying operation of the relay 4. In response to the application of the computed binary code to the decoder 7, it operates to close the switch 12; and likewise in response to the application of computed binary code to the decoder 8, it operates to close the switch 14.

The current senders 9 and 10 are then operated to cause the selected core 11 to change its state. An output of the electronic switching control 1 is connected to respective control inputs of the current senders 9 and 10. For simplicity, the current sender 10 is represented as comprising two sources of current 16 and 17 connected in opposite polarities with respect to its switches 18 and 19. Likewise, the current sender 10 is shown having sources of current connected in opposite polarity to the switches 20 and 21. The current sender 9 has one terminal connected to all the switches, corresponding to the switch 12 of the decoder 7, that are connected to the column windings of the cores of the memory matrix 2 so that the sender 9 can be connected through any selected operated switch of the decoder 7 to a respective column of windings. The other terminal of the current sender 9 is connected to a terminal that is connected to all of the series circuits that comprises the column windings of the matrix 2 at a point opposite the decoder switches that correspond to switch 12. Likewise, the sender 10 is connected between the switches, corresponding to the switch 14, of the decoder 8 and the common terminal of the row windings of the cores of the matrix 2 so that sender 10 is connected in series with any row of windings that is selected by the operation of the decoder 8.

In the example of operation that is being described, the switch 12 of the decoder 7 and the switch 14 of the decoder 8 are operated to select a core 11. Immediately, either a switch 20 or a switch 21 of the current sender 9 and a corresponding switch 18 or switch 19 of the current sender 10 are operated to cause core 11 to change state.

One of the circuits for energizing with the selected core 11 can be traced from the sender 9 through switch 12 of the decoder 7, all the series windings of the cores in the colums that include core 11, and a return conductor to the sender 9. Likewise, another circuit for energizing the core 11 can be traced from the sender 10 through the switch 14 of the decoder 8, the series windings in the row that includes core 11, and a return conductor to the sender 10. According to conventional operation of core matrices, the current flow through only one winding of any core is insufficient to cause it to change state, but current through both windings of the selected core, such as core 11 that is common to both the energized column and the energized row, changes state. For example, the operation of the switch 20 of the current sender 9 and the corresponding switch 18 of the sender 10 may operate the preselected core 11 from a first, or off, state to a second, or on, state, and subsequently the operation of the switch 21 of the sender 9 and of the corresponding switch 19 of the sender 10 will return the preselected core 11 from the on state to the off state.

During transition of the core 11 from its off state to its on state a pulse of one polarity is generated for application to the transistor driver 3 to cause operation of the relay 4. During transition of the core 11 from its on state to its off state, a pulse of opposite polarity is developed for application to the transistor driver 3 to release the relay 4.

Each core of the memory matrix 2 has a secondary winding connected to the input of a respective transistor driver. In the accompanying figure, two transistor drivers 2 and 5, that are shown as examples, are connected respectively to secondary windings of the cores 11 and 22. Each winding has a sufficient number of turns to provide the necessary turn-on pulses and turn-off pulses that are required to operate respective transistors of the drivers.

The secondary winding of the core 11 is connected to apply pulses to the base of a type PNPN transistor 23. One terminal of the winding is connected to ground, and the other terminal is connected through a limiting resistor 24 to the base of the transistor 23.

The transistor 23 is a four-layer silicon, gate-controlled transistor. It differs from a thyratron in operation in that it not only can be switched on with a pulse, but also can be switched off with a pulse of opposite polarity. The amplitude of the pulses, that are applied between the emitter and the base of transistor 23 to ground, to gate it on need not be as great as the amplitude of the pulses, that are applied between the same electrodes, to gate it off. In order to provide pulses of different amplitude, the emitter of the transistor 23 is connected to ground through a bias network that comprises parallel resistor 25 and capacitor 26. To gate the transistor 23 to a stable state of conduction, a positive pulse is applied to its base as the core 11 changes from an off state to an on state. While the transistor is conductive, the capacitor 26 is charged as a result of the voltage drop across the resistor 24. When a negative pulse is applied between the base of the transistor 23 and ground to gate off the transistor for releasing the relay 4, the voltage across the parallel resistor 25 and the capacitor 26 is added to the applied voltage of the pulse to increase the potential difference that is momentarily applied between the base 23 and ground.

The collector of the transistor 23 is connected through a winding of the relay 4 to a positive terminal. The relay 4 has contacts 27 that, in a telephone system, may be operated to provide supervisory service.

While the distributor of this invention has been described for a particular embodiment that is shown in the accompanying figure, the distributor can be changed for various uses in ways obvious to those skilled in the art and still be within the scope of the following claims.

What is claimed is:

1. In a switching system having an electronic switching control circuit and a plurality of electromechanical devices controlled by said circuit,
   - an electronic-to-electromechanical distributor interposed between said electronic switching control circuit and said electromechanical devices, said distributor comprising:
   - a plurality of memory cores, each having two stable states,
   - means operated by said electronic switching control circuit for successively selecting individual ones of said cores and selectively changing the state of said selected core to one or the other state which is opposite its present state,
   - a plurality of bistable gate-controlled semiconductor devices, each of said semiconductor devices having an input coupled to a respective one of said memory cores and an output connected to a corresponding one of said electromechanical devices, and
   - each of said semiconductor devices being operated to its conductive state in response to the switching of said respective coupled core to said one state and being operated to its nonconductive state in response to the switching of said respective core from said one state to said other state.

2. A switching system as claimed in claim 1, wherein said cores are arranged in a matrix.

3. A switching system as claimed in claim 2, wherein said selecting means comprises decoder means connected between said control circuit and said cores, said decoder means being responsive to coded addresses from said electronic switching control circuit to select a corresponding individual one of said cores.

4. In a switching system as claimed in claim 3, wherein said matrix has a plurality of column windings and a plurality of row windings for said cores, said decoder means being connected to said windings and being controlled by said electronic switching control circuit to select a combination of one of said column windings and one of said row windings corresponding to said selected core, said selecting means also including bidirectional current control means connected to said windings, said bidirectional current control means being controlled by said electronic control means subsequent to the selection of a core by said decoder to introduce current flow in the required direction in said selected windings to change the state of said selected core.

5. In a switching system having an electronic switching control circuit and a plurality of electromechanical devices controlled by said control circuit, an electronic-to-electromechanical distributor interposed between said electronic switching control circuit and said electromechanical devices, said distributor comprising:

a plurality of memory cores, each having two stable states, a plurality of energizing windings linking different ones of said cores, switching means having input control circuits connected to said electronic switching control circuit and output switching terminals connected to different ones of said energizing windings, said switching means including a source of current for introducing current flow in either direction into selected ones of said energizing windings, said switching means responding to an address given by said electronic switching control circuit to select one of said cores for connection to said source of current and subsequently to complete a connection to said source of current for introducing current flow in the required direction for changing the state of said selected core, and a semiconductor device for each of said cores, each of said semiconductor devices having an input circuit linking its respective core and an output circuit connected to a corresponding one of said electromechanical devices, each of said semiconductor devices being operable to a first stable state of conduction in response to application of a pulse of one polarity to its input circuit for operating said corresponding electromechanical device and being operable to a second stable state of nonconduction in response to application of a pulse of opposite polarity to its input cricuit for releasing said corresponding electromechanical device, whereby, any one of said electromechanical devices is selectively maintained operated for any desired interval between successive respective addresses of short duration applied from said electronic switching control circuit to said switching means.

6. In a switching system having an electronic switching control circuit and a plurality of electromechanical devices controlled by said control circuit, an electronic-to-electromechanical distributor interposed between said electronic switching control circuit and said electromechanical devices, said distributor comprising:

a memory matrix having a plurality of bistable memory cores arranged in rows and columns, first and second energizing circuits for said cores, said first energizing circuit having a branch circuit for each of said columns, each of said branch circuits linking each core of its respective column, said second energizing circuit having a branch circuit for each of said rows, each of said last-mentioned branch circuits linking each core of its respective row, each of said energizing circuits including a branch selective switch having a switching element for each branch and a current sender common to all branches of the respective energizing circuit, each common current sender having two selectable modes of operation for determining a respective direction of current flow through a selected branch of said corresponding energizing circuit, each of said energizing circuits having an input control circuit connected to said electronic switching control circuit for controlling operation of said selective switches and said common current senders, said electronic switching control circuit being operable in response to a command from said electronic switching control circuit to select and to operate one of said switching elements in each of said branch selective switches, and subsequently to select one of said modes of operation and to operate both of said current senders, the mode of operation of said current senders being selected for sending current in said respective selected branch circuits in the required direction to change the state of said selected core, a gate-controlled rectifier having an input coupled to each of said cores and an output connected to a respective one of said electromechanical devices, each of said gate-controlled rectifiers having a first state for operating a respective electromechanical device and a second state for releasing said respective electromechanical device, each of said gate-controlled rectifiers being operable to its first state in response to application of a pulse of one polarity from a respective one of said cores and being operable to its second state in response to application of a pulse of opposite polarity from said respective core, and the polarity of said pulses being determined by the direction of change of state of said respective cores and therefore determined by the direction of current flow from said senders to change the state of said selected core.

References Cited

UNITED STATES PATENTS

| | | | |
|---|---|---|---|
| 3,108,256 | 10/1963 | Bucholz et al. | 340—172.5 |
| 3,237,100 | 2/1966 | Chalfin et al. | 340—172.5 X |
| 3,243,582 | 3/1966 | Holst | 340—172.5 X |
| 3,254,324 | 5/1966 | Casciato et al. | 340—172.5 X |
| 3,260,999 | 7/1966 | Grammer | 340—172.5 |
| 3,274,554 | 9/1966 | Hopper et al. | 340—172.5 |
| 3,283,313 | 11/1966 | Hathaway | 340—174 |
| 3,289,173 | 11/1966 | Smith | 340—172.5 |
| 3,289,180 | 11/1966 | Loughead | 340—174 |

PAUL J. HENON, *Primary Examiner.*